United States Patent
Belloni et al.

(10) Patent No.: US 9,054,856 B2
(45) Date of Patent: Jun. 9, 2015

(54) PROCESSING SAMPLES OF A RECEIVED RF SIGNAL

(75) Inventors: Fabio Belloni, Espoo (FI); Ville Ranki, Jorvas (FI); Andreas Richter, Espoo (FI); Neelabh Kashyap, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/982,317

(22) PCT Filed: Feb. 7, 2011

(86) PCT No.: PCT/IB2011/050509
§ 371 (c)(1),
(2), (4) Date: Jul. 29, 2013

(87) PCT Pub. No.: WO2012/107797
PCT Pub. Date: Aug. 16, 2012

(65) Prior Publication Data
US 2013/0315353 A1    Nov. 28, 2013

(51) Int. Cl.
| | | |
|---|---|---|
| *H04L 7/00* | (2006.01) | |
| *H04L 7/04* | (2006.01) | |
| *G01S 3/46* | (2006.01) | |
| *H04B 7/08* | (2006.01) | |
| *H04L 27/26* | (2006.01) | |

(52) U.S. Cl.
CPC . *H04L 7/042* (2013.01); *G01S 3/46* (2013.01); *H04B 7/0822* (2013.01); *H04B 7/0842* (2013.01); *H04L 27/2659* (2013.01); *H04L 27/2676* (2013.01)

(58) Field of Classification Search
USPC .................. 375/316, 344, 343, 349, 259, 260
See application file for complete search history.

(56) References Cited

U.S. PATENT DOCUMENTS

| | | | |
|---|---|---|---|
| 6,069,583 A | 5/2000 | Silvestrin et al. | |
| 6,952,460 B1 | 10/2005 | Van Wechel et al. | |
| 7,324,601 B2 * | 1/2008 | Kim | 375/260 |
| 7,733,971 B2 * | 6/2010 | Roh et al. | 375/260 |
| 2008/0095249 A1 * | 4/2008 | Yoon et al. | 375/260 |

(Continued)

FOREIGN PATENT DOCUMENTS

EP    1276251    1/2003

OTHER PUBLICATIONS

Kohno, R.,"Spatial and Temporal Communication Theory Using Adaptive Antenna Array," IEEE Personal Communications, IEEE Communications Society, vol. 5, No. 1, Feb. 1, 1998, pp. 28-35.

(Continued)

*Primary Examiner* — Siu Lee
(74) *Attorney, Agent, or Firm* — Locke Lord LLP

(57) ABSTRACT

An exemplary apparatus includes: means configured to obtain a set of plural samples of signals, the set comprising at least one sample for each of L antenna elements of a receiver, where L is an integer greater than two and where the samples are of an RF signal that has been downconverted by a downconversion frequency; means configured, for each antenna element, to perform autocorrelation on the samples relating to that antenna element; means configured to sum the results of autocorrelation for all antenna elements; means configured to convert the summed results into the frequency domain; means configured to determine a maximum value of the summed results in the frequency domain; and means configured to use the determined maximum value to provide an output indicative of an offset between a carrier of the RF signal and the downconversion frequency.

23 Claims, 12 Drawing Sheets

(56) References Cited

U.S. PATENT DOCUMENTS

2010/0020907 A1     1/2010   Rezvani et al.
2010/0202546 A1*   8/2010   Ruan et al. .................... 375/260

OTHER PUBLICATIONS

Yilmaz, A. O., "Cooperative diversity in carrier frequency offset", IEEE Communications Letters, vol. 11, No. 4, Apr. 1, 2007, pp. 307-309.

Extended European Search Report of EP App. No. 11858105.7—Date of Completion of Search: Apr. 8, 2014, 5 pages.

International Search Report and Written Opinion received for corresponding Patent Cooperation Treaty Application No. PCT/IB2011/050509, dated Nov. 2, 2011, 13 pages.

Proakis, Digital Communications (2nd ed.) McGraw-Hill, pp. 49, 55-56, 1989.

You et al., Stochastic Voltage Model and Experimental Measurement of Ocean-Scattered GPS Signal Statistics, IEEE Transactions on Geoscience and Remote Sensing. Oct. 2004, vol. 42, No. 10, pp. 2160-2169.

\* cited by examiner

PROCESSING SAMPLES OF A RECEIVED RF SIGNAL

RELATED APPLICATION

This application was originally filed as Patent Cooperation Treaty Application No. PCT/IB2011/050509 filed Feb. 7, 2011.

FIELD

The invention relates to processing samples of a received RF signal, and in particular although not exclusively to carrier frequency offset compensation in receivers.

BACKGROUND

There are a number of known techniques for determining the position of an apparatus using radio frequency signals. Some popular techniques relate to use of the Global Positioning System (GPS), in which multiple satellites orbiting Earth transmit radio frequency signals that enable a GPS receiver to determine its position. However, GPS is often not very effective in determining an accurate position indoors.

Systems have been proposed for allowing location determination indoors using multi-antenna arrays and a single receiver. Here, different elements of the array are connected to the receiver in turn by a switch. Samples of the signals thus provided are processed to determine a bearing from which the signal was received.

In order to obtain accurate measurements in such systems, the receiver is configured to determine and compensate a difference in frequency between the RF carrier of the received signal and a downconversion frequency used at the receiver. Because of the switching taking place at RF, many conventional techniques for calculating carrier frequency offset are not applicable. There are, however, various ways in which carrier frequency offset can be calculated. One technique, although in a slightly different type of system in which a multi-element antenna is used for transmission to a single-element receiver, is disclosed in WO 2009/56150.

SUMMARY

A first aspect of this specification provides a method comprising:
  obtaining a set of plural samples of signals, the set comprising at least one sample for each of L antenna elements of a receiver, where L is an integer greater than two and where the samples are of an RF signal that has been downconverted by a downconversion frequency;
  for each antenna element, performing autocorrelation on the samples relating to that antenna element;
  summing the results of autocorrelation for all antenna elements;
  converting the summed results into the frequency domain;
  determining a maximum value of the summed results in the frequency domain; and
  using the determined maximum value to provide an output indicative of an offset between a carrier of the RF signal and the downconversion frequency.

Converting the summed results into the frequency domain may comprise performing a fast Fourier transform.

The method may comprise weighting the autocorrelated samples before summing the results of autocorrelation.

Performing autocorrelation of samples relating to an antenna element may comprise converting vectors provided by the samples relating to the antenna element into time domain vectors and squaring the time domain vectors.

Converting vectors may comprise performing an inverse fast Fourier transform with P points and wherein converting the summed results into the frequency domain comprises performing a first fast Fourier transform with P points.

Performing autocorrelation may comprise performing convolution on the samples.

The method may comprising writing the set of plural samples into a memory having a L columns and kL rows, where k is the maximum number of samples relating to any antenna element.

A second aspect of this specification provides a method comprising:
  obtaining a set of plural samples of signals, the set comprising at least one sample for each of L antenna elements of a receiver, where L is an integer greater than two and where the samples are of an RF signal that has been downconverted by a downconversion frequency;
  for each antenna element, converting vectors provided by the samples relating to that antenna element into frequency domain vectors and squaring the frequency domain vectors;
  summing the squared frequency domain vectors for all antenna elements;
  determining a maximum value of the summed results in the frequency domain; and
  using the determined maximum value to provide an output indicative of an offset between a carrier of the RF signal and the downconversion frequency.

Converting the summed results into the frequency domain may comprise performing a fast Fourier transform.

The method may comprise weighting the frequency domain vectors before summing the squared frequency domain vectors.

Any of the above methods may comprise organising the plural samples by:
  providing a block of memory having L columns;
  initialising the block of memory;
  filling the block of memory such that a jth element of the set of samples is entered into a position described by a coordinate <row, column>=<j,I>, where I denotes an antenna element to which the sample relates. The method may comprise creating a vector for each antenna element from the samples in the row corresponding to the respective antenna element.

Providing the block of memory may comprise providing a block of memory having 2kL−1 rows and L columns.

A third aspect of this specification provides a computer program comprising machine readable instructions that when executed by computer apparatus control it to perform a method as recited above.

A fourth aspect of the invention provides apparatus comprising:
  means configured to obtain a set of plural samples of signals, the set comprising at least one sample for each of L antenna elements of a receiver, where L is an integer greater than two and where the samples are of an RF signal that has been downconverted by a downconversion frequency;
  means configured, for each antenna element, to perform autocorrelation on the samples relating to that antenna element;
  means configured to sum the results of autocorrelation for all antenna elements;
  means configured to convert the summed results into the frequency domain;

means configured to determine a maximum value of the summed results in the frequency domain; and means configured to use the determined maximum value to provide an output indicative of an offset between a carrier of the RF signal and the downconversion frequency.

A fifth aspect of this specification provides apparatus comprising:

means configured to obtain a set of plural samples of signals, the set comprising k samples for each of L antenna elements of a receiver, where L is an integer greater than two and where the samples are of an RF signal that has been downconverted by a downconversion frequency;

means configured, for each antenna element, to convert vectors provided by the samples relating to that antenna element into frequency domain vectors and to square the frequency domain vectors;

means configured to sum the squared frequency domain vectors for all antenna elements;

means configured to determine a maximum value of the summed results in the frequency domain; and means configured to use the determined maximum value to provide an output indicative of an offset between a carrier of the RF signal and the downconversion frequency.

A sixth aspect of this specification provides apparatus comprising:

a receiver configured to receive a set of plural samples of signals, the set comprising at least one sample for each of L antenna elements of a receiver, where L is an integer greater than two and where the samples are of an RF signal that has been downconverted by a downconversion frequency;

an autocorrelator configured, for each antenna element, to perform autocorrelation on the samples relating to that antenna element;

a summer configured to sum the results of autocorrelation for all antenna elements;

a domain converter configured to convert the summed results into the frequency domain;

a determiner configured to determine a maximum value of the summed results in the frequency domain; and an offset provider configured to use the determined maximum value to provide an output indicative of an offset between a carrier of the RF signal and the downconversion frequency.

A seventh aspect of this specification provides apparatus comprising:

a receiver configured to receive a set of plural samples of signals, the set comprising k samples for each of L antenna elements of a receiver, where L is an integer greater than two and where the samples are of an RF signal that has been downconverted by a downconversion frequency;

a converter configured, for each antenna element, to convert vectors provided by the samples relating to that antenna element into frequency domain vectors and to square the frequency domain vectors;

a summer configured to sum the squared frequency domain vectors for all antenna elements;

a determiner configured to determine a maximum value of the summed results in the frequency domain; and an offset provider configured to use the determined maximum value to provide an output indicative of an offset between a carrier of the RF signal and the downconversion frequency.

An eighth aspect of this specification provides a computer readable medium having stored thereon machine readable instructions that when executed control it to perform:

obtaining a set of plural samples of signals, the set comprising at least one sample for each of L antenna elements of a receiver, where L is an integer greater than two and where the samples are of an RF signal that has been downconverted by a downconversion frequency;

for each antenna element, performing autocorrelation on the samples relating to that antenna element;

summing the results of autocorrelation for all antenna elements;

converting the summed results into the frequency domain;

determining a maximum value of the summed results in the frequency domain; and using the determined maximum value to provide an output indicative of an offset between a carrier of the RF signal and the downconversion frequency.

A ninth aspect of this invention provides apparatus comprising:

one or more processors in communication with one or more memories, the one or memories having stored therein one or more computer programs that include computer code configured such as when executed to cause the processor to:

obtain a set of plural samples of signals, the set comprising at least one sample for each of L antenna elements of a receiver, where L is an integer greater than two and where the samples are of an RF signal that has been downconverted by a downconversion frequency;

for each antenna element, perform autocorrelation on the samples relating to that antenna element;

sum the results of autocorrelation for all antenna elements;

convert the summed results into the frequency domain;

determine a maximum value of the summed results in the frequency domain; and use the determined maximum value to provide an output indicative of an offset between a carrier of the RF signal and the downconversion frequency.

A tenth aspect of this specification provides computer readable medium having stored thereon machine readable instructions that when executed control it to perform:

obtaining a set of plural samples of signals, the set comprising at least one sample for each of L antenna elements of a receiver, where L is an integer greater than two and where the samples are of an RF signal that has been downconverted by a downconversion frequency;

for each antenna element, converting vectors provided by the samples relating to that antenna element into frequency domain vectors and squaring the frequency domain vectors;

summing the squared frequency domain vectors for all antenna elements;

determining a maximum value of the summed results in the frequency domain; and using the determined maximum value to provide an output indicative of an offset between a carrier of the RF signal and the downconversion frequency.

An eleventh aspect of this invention provides apparatus comprising:

one or more processors in communication with one or more memories, the one or memories having stored therein one or more computer programs that include computer code configured such as when executed to cause the processor to:

obtain a set of plural samples of signals, the set comprising at least one sample for each of L antenna elements of a receiver, where L is an integer greater than two and where the samples are of an RF signal that has been downconverted by a downconversion frequency;

for each antenna element, convert vectors provided by the samples relating to that antenna element into frequency domain vectors and squaring the frequency domain vectors;

sum the squared frequency domain vectors for all antenna elements;

determine a maximum value of the summed results in the frequency domain; and use the determined maximum value to provide an output indicative of an offset between a carrier of the RF signal and the downconversion frequency.

BRIEF DESCRIPTION OF THE DRAWINGS

For a better understanding of various embodiments reference will now be made by way of example only to the accompanying drawings in which.

DETAILED DESCRIPTION OF EMBODIMENTS

Figure 1:
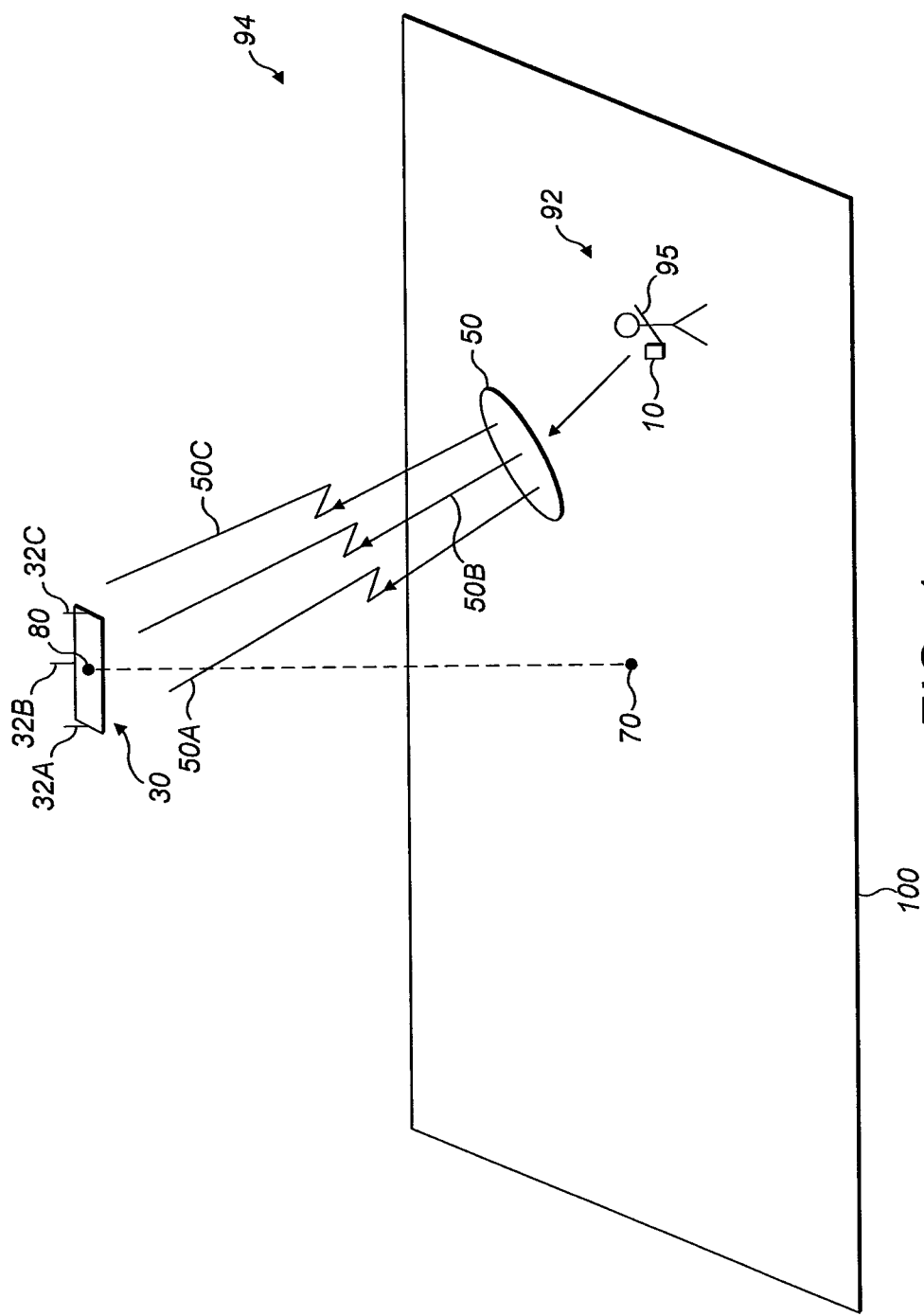
FIG. 1 illustrates a base station apparatus according to aspects of embodiments receiving radio signals from a transmitter according to other aspects of the embodiments.

FIG. 1 illustrates a person 92 (carrying a mobile radio communications apparatus 10) at a position 95 on a floor 100 of a building 94. The building 94 could be, for example, a shopping centre or a conference centre. The mobile radio communications apparatus 10 is hereafter referred to as a mobile device. The mobile device 10 includes radio transmitter functionality and so can be called a transmitter. The mobile device 10 is operable to transmit radio signals that are receivable by the base station 30, for instance Bluetooth Low Energy (BT LE) protocol signals.

A base station receiver apparatus 30 is positioned at a location 80 of the building 94. In the illustrated example, the location 80 is on the ceiling of the building 94 (i.e. the overhead interior surface) but in other implementations the receiver may be placed elsewhere, such as on a wall or within an under-floor cavity. For reasons that will become apparent, the base station receiver apparatus 30 can be termed a positioning device or positioning receiver.

The location 80 is directly above the point denoted with the reference numeral 70 on the floor 100 of the building. The base station 30 is for enabling the position of the mobile device 10 to be determined, although that is not necessarily the only function provided by the base station 30. For example, the base station 30 may be part of a transceiver for providing wireless internet access to users of apparatuses 10, for example, via wireless local area network (WLAN) or Bluetooth Low Energy radio signals.

Briefly, the mobile device 10 transmits signals which are received at the base station 30. The base station 30 takes I and Q samples of the received signals. These I and Q samples are processed to determine a bearing of the mobile device 10 from the base station 30. From the bearing, the location of the mobile device 10 may be calculated. Calculation of the bearing from the I and Q samples, or alternatively from part-processed I and Q samples, may be performed by the base station 30, or externally to the base station. If bearing calculation is performed externally to the base station 30, I and Q samples or part-processed samples of the received signals are sent from the base station 30 to a server (not shown).

Figure 2:
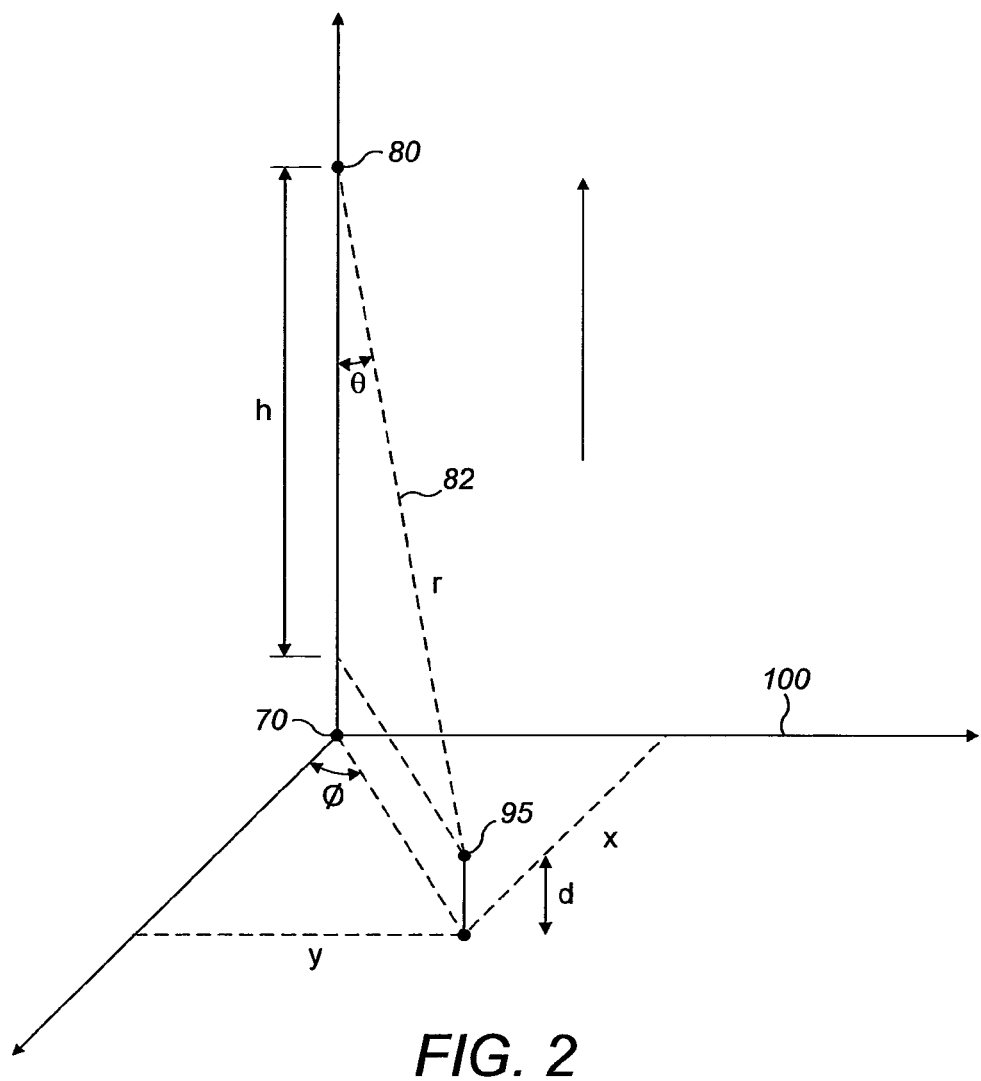
FIG. 2 illustrates geometry of the FIG. 1 scenario.

The position 95 of the person 92 is defined by specifying a position along a bearing 82 (illustrated in FIG. 2) which runs from the location 80 of the base station 30 through the location 95 of the mobile device 10. The bearing 82 is defined by an elevation angle θ and an azimuth angle Φ.

The mobile device 10 may, for example, be a hand portable electronic device such as a mobile radiotelephone. The mobile device 10 may or may not include a positioning receiver such as a GPS receiver. The mobile device 10 may be a relatively simple device having limited functionality, such as a mobile tag. Here, the mobile tag 10 may be absent of a receiver. A mobile tag is absent of voice communication capability, and may also be absent of a display and audio transducers.

The mobile device 10 may transmit radio signals 50 periodically as beacons. The radio signals may, for example, have a transmission range of 100 meters or less. For example, the radio signals may be 802.11 wireless local area network (WLAN) signals, Bluetooth signals, Ultra wideband (UWB) signals or Zigbee signals. In the following embodiments, the radio signals preferably are signals transmitted according to the Bluetooth Low Energy protocol.

Figure 3:
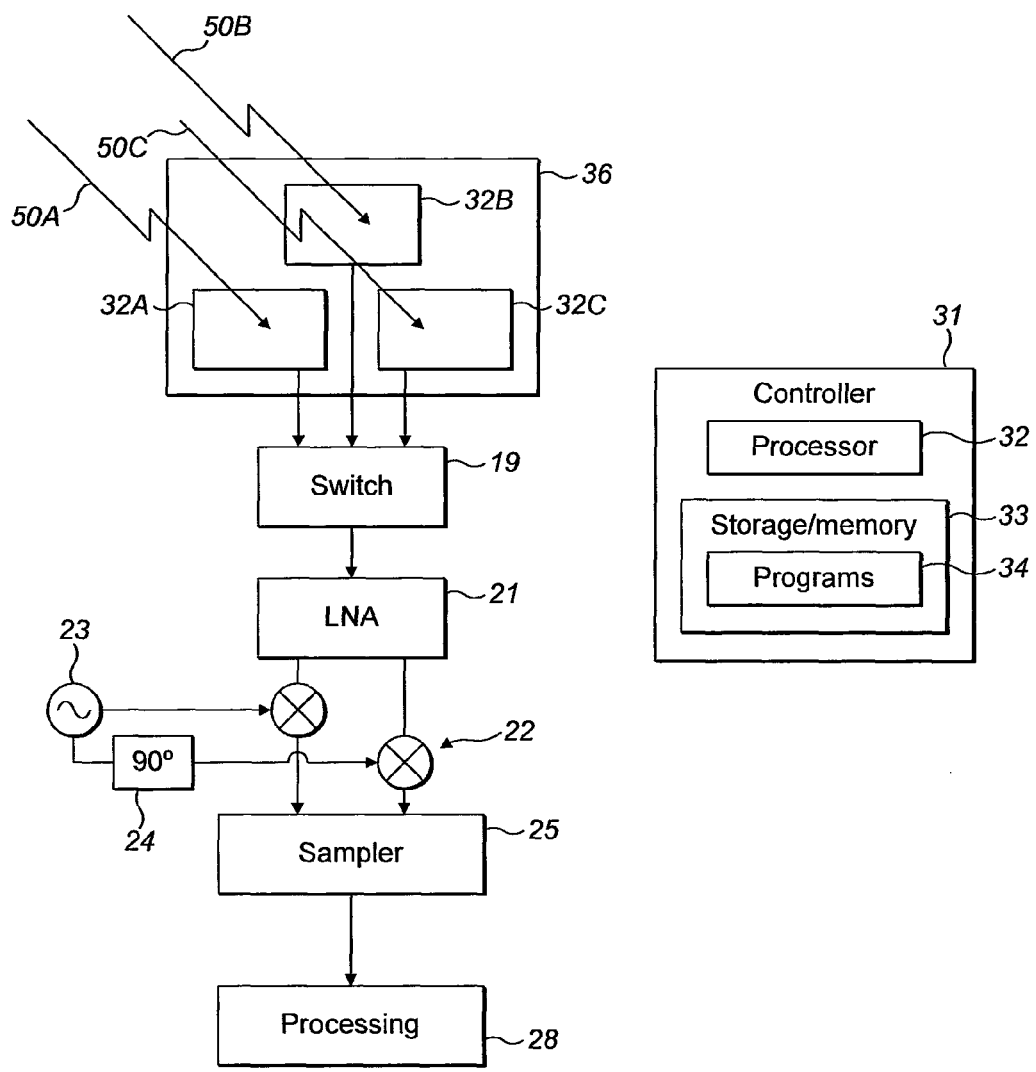
FIG. 3 schematically illustrates one example of part of the base station of FIG. 1.

FIG. 3 schematically illustrates one example of part of the base station 30. The base station 30 comprises an antenna array 36 comprising a plurality of antenna elements 32A, 32B, 32C which receive respective radio signals 50A, 50B, 50C transmitted from the mobile device 10. Although three antenna elements 32 are shown, three is the minimum and the embodiments described here may include more, for instance 16 elements. In embodiments described below, 10 elements are present.

Each of the plurality of antenna elements 32A, 32B, 32C is connected to an switch 19, which is controllable by a controller 31 as described below. The switch 19 is controlled so that only one of the antenna elements 32A, 32B, 32C is connected to an amplifier 21 at a given time. The outputs of the amplifier 21 are received at a mixer arrangement 22. This is provided with in-phase (I) and quadrature (Q) signals by an arrangement of a local oscillator 23, which may be analogue or digital, and a 90° phase shifter 24. A sampler 25 is configured to receive I and Q output signals from the mixer arrangement and take digital samples thereof. The sampler 25 may take any suitable form, for instance including two digital to analogue converter (DAC) channels, one for the I channel and one for the Q channel. The effect of the mixer arrangement 24 and the sampler 25 is to downconvert the received signals and to provide digital I and Q samples of the downmixed signals.

An output of the sampler 25 is provided to a processing module 28.

A controller 31 is configured to control the other components of the base station apparatus 30. The controller may take any suitable form. For instance, it may comprise processing circuitry 32, including one or more processors, and a storage device 33, comprising a single memory unit or a plurality of memory units. The storage device 33 may store computer program instructions 34 that, when loaded into processing circuitry 32, control the operation of the base station 30. The computer program instructions 34 may provide the logic and routines that enables the apparatus to perform the functionality described above. The processing module 28 may be comprised solely of the controller 31. The computer program instructions 34 may arrive at the base station apparatus 30 via an electromagnetic carrier signal or be copied from a physical entity 21 such as a computer program product, a memory device or a record medium such as a CD-ROM or DVD.

The processing circuitry 32 may be any type of processing circuitry. For example, the processing circuitry 32 may be a programmable processor that interprets computer program instructions 34 and processes data. The processing circuitry 32 may include plural programmable processors. Alternatively, the processing circuitry 32 may be, for example, programmable hardware with embedded firmware. The processing circuitry 32 may be a single integrated circuit or a set of integrated circuits (i.e. a chipset). The processing circuitry 32 may also be a hardwired, application-specific integrated circuit (ASIC). The processing circuitry may be termed processing means.

The processing circuitry 32 is connected to write to and read from the storage device 33. The storage device 33 may be a single memory unit or a plurality of memory units.

The controller 31 operates to control the switch 19 to connect the antenna elements 32A, 32B, 32C to the amplifier 21 in turn. The controller 31 controls the switch 19 to connect one of the antenna elements 32A, 32B, 32C to the amplifier for the duration of transmission of the header of a packet transmitted by the mobile device 10. After the header has been received, the controller 31 controls the switch 19 to connect different one of the antenna elements 32A, 32B, 32C to the LNA 21 in a sequence. The interval between successive switching of the switch 19 can be equal to the symbol rate used in the payload of the transmitted packets or substantially equal to an integer multiple of the symbol rate.

The base station 30, in particular the processing module 28, is configured to use parameters of complex signals received from the sampler 25 to calculate a bearing to the mobile device 10 from the base station 30. The way in which bearing calculation is performed is outside the scope of this specification but is described in, for instance, co-pending application nos. PCT/IB2010/054426 and PCT/IB2010/054905, the contents of which are incorporated herein by reference.

Instead of calculating the bearing to the mobile device 10, the base station may transmit relevant information for remote processing.

In a prototype system constructed by the inventors, sixteen antenna elements 32A are used. In this system, each antenna element is sampled twice although one antenna element (a reference element) is sampled more frequently. Performing three measurements results in 104 samples which, with one byte for each I and Q sample, totals 208 bytes of data. These bytes are included in the message.

The I and Q samples constitute complex signal parameters in that the I and Q samples together define parameters of a complex signal.

Figure 4:
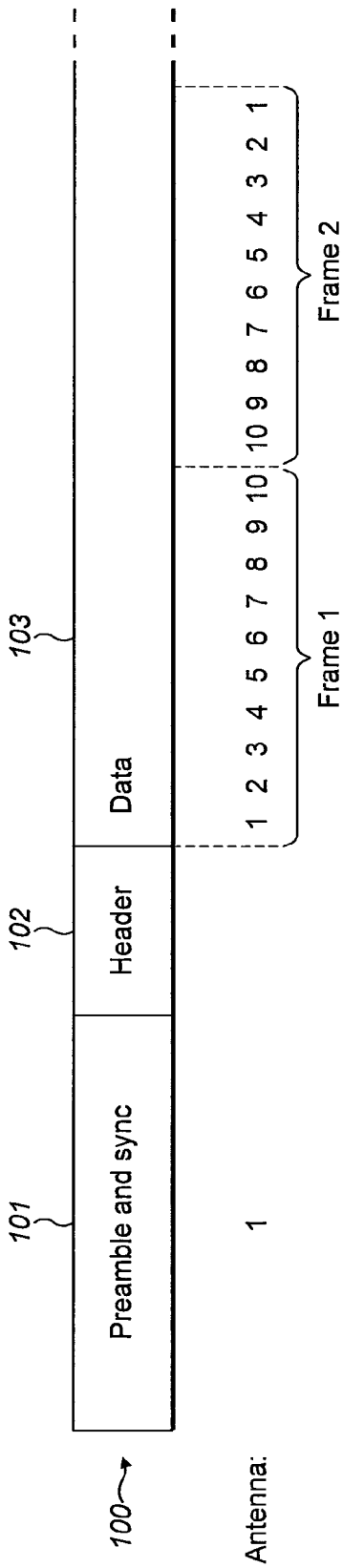
FIG. 4 illustrates a beacon message as transmitted by the mobile station of FIG. 1.

Instead of processing 'raw' I and Q samples, the controller 31 may process the I and Q samples to provide other complex signal parameters relating to the received signals, from which bearing calculation can be performed. For instance, the controller 31 may provide averaging of the I and Q samples in the angle/phase domain before converting the averages back to the I and Q domain (one sample for each antenna) and providing the averaged samples as complex signal parameters. Alternatively, the controller 31 may calculate amplitude and/or phase information from the I and Q samples, and provide the amplitude, phase or phase and amplitude information as complex signal parameters FIG. 4 illustrates a beacon message or positioning packet as transmitted by the mobile station 10, and shows switching between antenna elements in the base station 30 when receiving a positioning packet from the mobile device 10. The beacon message 100 comprises three key sections, namely a preamble and sync section 101, a header 102 and a data section 103. The purpose of the preamble and sync section 101 is to allow a receiver to synchronise itself with the transmissions. To this end, the preamble and sync section 101 may include alternating zeros and ones. The header 102 includes various information, including information identifying the mobile device 10. The header 102 may also indicate a transmit power of the mobile device 10.

The data section 103 does not include any information content. The purpose of the data section 103 is to enable a receiver, such as the base station 30, to be able to calculate a bearing to the mobile device from the receiver. In this example, the data comprises a sequence of ones. The data is notionally formed into a number of frames, two of which are shown at frame 1 and frame 2 in the figure. When receiving the data section 103, the base station 30 switches between different ones of the antenna elements. However, when receiving the preamble and sync section 101 and the header 102, switching is disabled so that only one of the antenna elements is connected to the receiver. In this example, it is the first antenna element that is connected to the receiver when the preamble and sync and header sections 101, 102 are being received.

Shown beneath the beacon signal 100 is an indication of the antenna element of the base station 30 that is connected to the receiver circuitry at a time corresponding to a part of the beacon 100. As shown, a first antenna element, for instance the antenna element 32A of FIG. 3, is connected to the receiver circuitry for the duration of transmission of the preamble and sync and header sections 101, 102 and for the first one-tenth of the frame 1 of the data section 103. The controller 31 controls the switch such that the antenna elements are connected to the receiver in turn. Each of ten antenna elements is connected in sequence to the receiver circuitry for equal periods of time in the first frame, in the sequence 1 . . . 10. This is shown in the section marked "frame 1" in the Figure, in which it can be seen that the controller 31 causes to be connected to receiver firstly the first antenna element, then the second antenna element, and so on up to the tenth antenna element.

At the end of the first frame, a second frame, labelled "frame 2" in the Figure, commences. In the second frame, the controller operates the switch so as to reverse the sequence of connection of antenna elements to the receiver. In particular, the controller causes the tenth antenna element to be connected to the receiver, followed by the ninth, the eight and so on until the first antenna element is connected to the receiver. The interval between successive switching is the same for each of the antenna elements, and is the same in the second frame as it is in the first frame. As such, the length of the second frame is the same as that of the first frame.

This switching sequence is merely illustrative and any suitable switching sequence may be used instead.

The switching interval is dependent on the hardware of the receiver, in particular the RF switch and filters. A faster switch and wider filters allow a shorter switching interval. It will be appreciated that the filter width however depends on the radio protocol. WLAN has wider filters than Bluetooth, for example. Bypassing the filters when performing RF switching means that the limiting factor is the switching speed of the switch. With standard filters (i.e. no hardware modifications to the receiver), a suitable switching frequency for Bluetooth Low Energy is <1 MHz and is <10 MHz (for WLAN). A suitable switching interval is the reciprocal of a suitable switching frequency.

The use of a single radio channel and rapid switching between antenna elements 32A, 32B, 32C gives rise to a number of issues. One is that carrier frequency offset cannot be calculated in any of the normal ways. Carrier offset is the difference between the frequency of the carrier of the RF signal transmitted by the mobile device 10 and the frequency of the downconverting signal used in the base station 30. In the example of FIG. 3, the downconverting signal is the signal provided by the local oscillator 23, although the frequency of the downconverting signal may be the sum of the frequencies of multiple oscillators in the case of a superheterodyne receiver.

Figure 5:
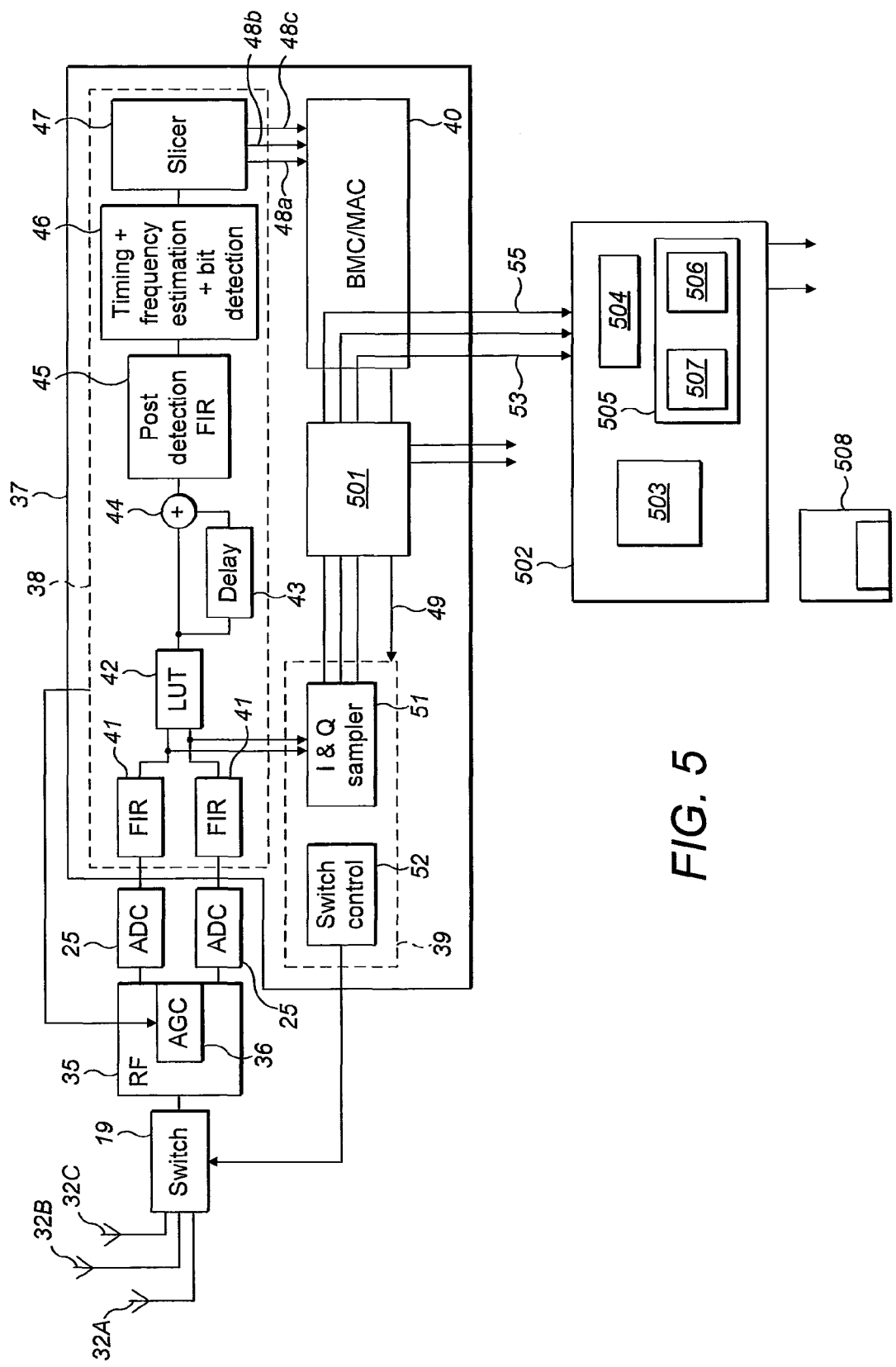
FIG. 5 is a block diagram illustrating one possible form for the base station of FIG. 3.

FIG. 5 is a block diagram illustrating one possible form for the base station 30, including some detail of the processing module 28. Reference numerals are retained from FIG. 3 for like elements.

At the output of the switch 19, an RF module 35 is connected. The RF module 35 includes an automatic gain control (AGC) part 36, which has a gain control input. The sampler 25, in the form of two analogue to digital converters, is connected to outputs of the RF module 35. The components thusfar described are implemented in hardware, and all of the other components shown in FIG. 5 are implemented on a field programmable gate array (FPGA) 37. The FPGA 37 includes 3 main blocks, namely a Bluetooth low energy receiver base band (BT LE BB) module 38, an antenna switching and I and Q sampling module 39 and a burst mode controller/media access controller (BMC/MAC) module 40. The control input of the AGC 36 is provided by the BT LE BB module 38.

Outputs of the sampler 25 are connected to 2 parallel finite impulse response (FIR) filters 41. Outputs of the FIR filters 41 are connected to inputs of a look up table (LUT) 42. An output of the LUT 42 is connected both to an input of a delay element 43 and to an input of a summer 44. The other input of the summer 44 is connected to the output of the delay element 43. An output of the summer 44 is connected to a post detection FIR filter 45. A timing and frequency estimation and bit detection module 46 is connected to an output of the post detection FIR filter 45. A slicer 47 is connected to an output of the timing and frequency estimation and bit detection module 46 and receives information bits therefrom.

The slicer provides 3 outputs to the BMC/MAC module 40. A first 48a carries a preamble found signal. A second 48b carries a sync found signal and a third 48c carries information bits.

A first output of the BMC/MAC module 40 is connected to an antenna switching on/off input of the antenna switching module 39.

The antenna switching and I and Q sampling module 39 includes an I and Q sampler 51 and a switch controller 52. The I and Q sampler has inputs connected to the outputs of the FIR filters 41. The I and Q sampler 51 provides 8 byte samples of I and Q signals respectively on first and second outputs 53, 54.

The I and Q sampler 51 provides an AGC output 55. The three outputs of the I and Q sampler 51 are connected to inputs of the BMC/MAC 40.

The BMC/MAC module 40 is operable to detect the format of received packets, and to ensure that correct packets are processed. The BMC/MAC module 40 is configured to disregard non-positioning packets. The BMC/MAC module 40 is also configured to cause antenna switching and I and Q sampling to be performed at the appropriate times during reception of a positioning packet.

The MAC part of the BMC/MAC module 40 also constructs the message/packets that include the complex signal parameters, e.g. the I and Q samples. The BMC/MAC module 40 also performs interference detection, as described above.

The switch controller 52 has an output that is connected to a control input of the switch 19. The output of the switch controller 52 thus controls which of the multiple antenna elements 32A-32C are connected to the RF module 35 at a given time. Depending on the signal provided on the output 49 of the BMC/MAC 40, the antenna switching module 39 is controlled either to switch between antenna elements 32A-32C in a desired sequence, or to connect only one of the antenna elements to the RF module 35.

The base station includes either a carrier frequency offset calculator and compensator 501 before the BMC/MAC 40 or a carrier frequency offset calculator and compensator 502 after the BMC/MAC 40. Both are shown in FIG. 5, although only one is present in a given implementation.

Figure 7:
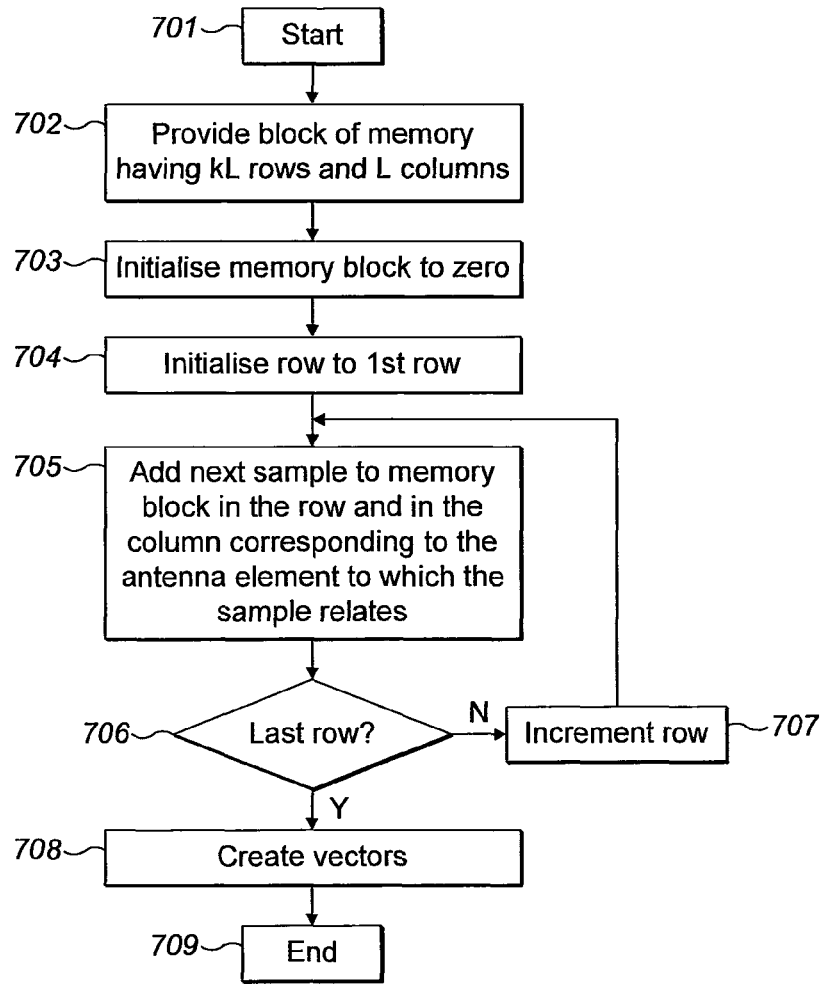
FIGS. 7 and 8 are flow charts illustrating operation of the FIG. 6 apparatus.
Figure 8:
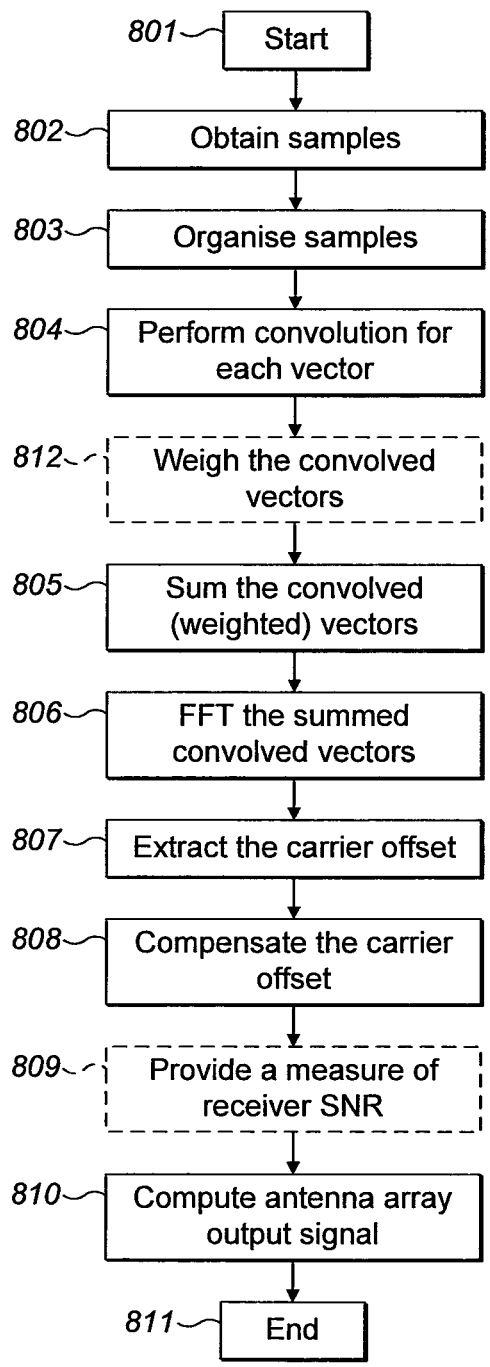

A first embodiment will now be described with reference to the schematic block diagram of FIG. 6 and the flow chart of FIGS. 7 and 8.

Briefly, in the first embodiment, autocorrelation is performed directly in the time domain by convolution circuits. A summer then provides the output of the autocorrelation circuit, which is fed to an FFT. A location of the maximum in the output vector of the FFT processor indicates the carrier frequency offset. The carrier frequency offset is then compensated for and the antenna array output signal can then be computed.

In detail, the first embodiment is as follows.

Figure 6:
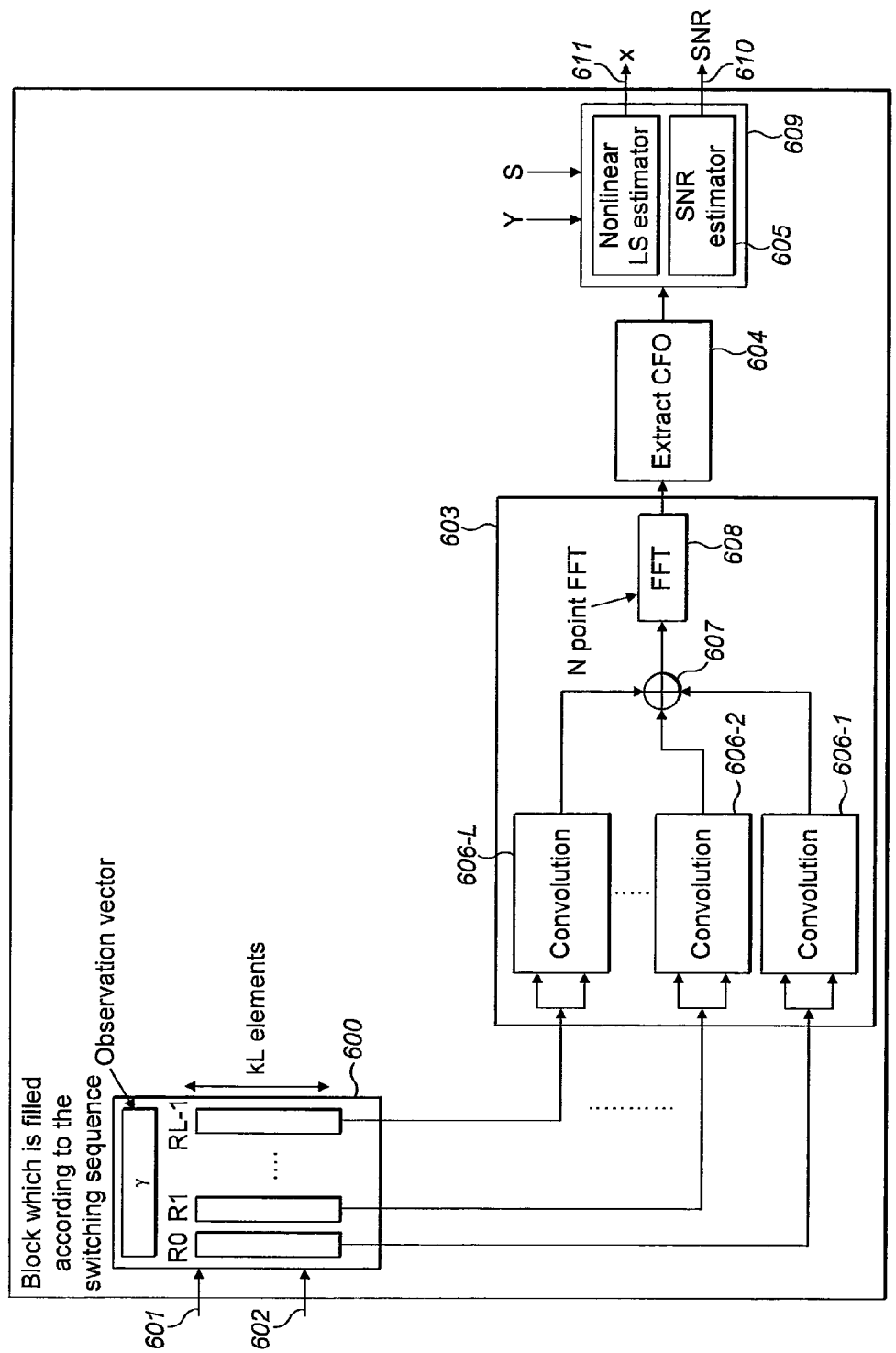
FIG. 6 is a block diagram illustrating apparatus according to a first embodiment for calculating and offsetting carrier frequency.

In FIG. 6, a memory block 600 is provided with plural rows (see below) and L columns. The columns here are numbered as R0 to RL−1. L is the number of antenna elements 32. The memory block 600 has two inputs. A first input 601 receives sample data from the sampler 25. A second input 602 receives switching sequence information s.

The memory block 600 is populated with an observation data vector y. The vector y constitutes a number of measurements (I-Q samples) that is equal to the length of the antenna switching sequence s used by the switch control element 52 to control the switch 19. The data vector y is provided by sampling each of the L antenna elements 32 at least once and at most k times. The order of the sampling of the antenna elements 32 is provided by switching sequence information s indicating which antenna element is sampled at any given time. The I-Q samples output from the I and Q sampler 51 are stored in the block of memory 600 and form the data vector y.

The number of rows with which the memory block 600 is provided may be equal to kL, which is the number of samples that is found if each antenna element 32 is sampled k times. Alternatively, fewer rows may be provided, although the number of rows should be at least equal to the number of samples (which is equal to the length of the switching sequence).

The apparatus of FIG. 6 firstly operates to organise the data vector y, then to correlate the data, then to extract the carrier frequency offset.

Organisation of the data vector y will now be described with reference to FIG. 7. The operation starts at step 701. At step 702, the memory block 600 is provided with kL rows and L columns as is shown in FIG. 6. At step 703, each element of the memory block 600 is initialised to take a zero value. At step 704, a pointer 614 addressing the memory row to which data will be filled into the memory block 600 is initialised to the first row of the memory block.

At step 705, the next sample of the observation data vector y is added to the memory block 600 in the row that is pointed to by the pointer 613 for being filled. The sample is added to the column in that row that corresponds to the antenna element 32 to which the sample relates. For instance, if the sample relates to the third antenna element 32c, the sample is added to the memory block 600 in the third column. At step 706, it is determined whether the row of the memory block 600 which was filled in step 705 (i.e. the row pointed to by the pointer 614) is the last row of the memory block. If it is determined that it is not the last row, at step 707 the pointer 614 (indicating the row to be filled with data) is incremented and the operation returns to step 705. On executing step 705 after step 707, the row of data to be filled is different to the row that was filled on the previous execution of step 705. The next sample is added in step 705 to the memory block in the next row. The sample is added in the column of that row which corresponds to the antenna element to which the sample relates, as described above.

Once step 706 reveals that the last row of the memory block 600 was filled by the step 705, indicating that the last sample of the observation vector y has been added to the memory block 600, the operation proceeds to step 708. Here, L vectors are created. One vector is created for each of the columns of the memory block 600 with the first column defining a vector R0, the second column defining a vector R1 etc. The result is L vectors that have been derived from the observation vector y. It will be appreciated that each of the vectors has been derived from the observation vector y. It will be appreciated also that each of the L vectors relates to samples for a different one of the antenna elements 32.

Referring back to FIG. 6, connected to the L outputs of the memory block 600 is an autocorrelation processing block 603. An output of the autocorrelation processing block 603 is connected to an input of a carrier frequency extraction block 604. An optional signal processing block 605 has an input connected to the output of the carrier frequency extraction block 604. The signal processing block 605 also has a second input 612, to which the observation data vector y is provided, and a third input 613, to which the switching sequence is provided.

The autocorrelation processing block 603 includes L convolution blocks labelled 606-1 to 606-L. Each of the convolution blocks 603 involves multiple inputs, which are connected to receive the data from the corresponding row of the memory block 600. Each of the convolution blocks 606 is configured to autocorrelate the received vector. A summer 607 is connected to the outputs of each of the convolution blocks 606 and is configured to sum the data provided by the convolution blocks 606.

The outputs of the convolution blocks 606 may be weighted before being provided to the summer 607. This is described below.

An N point FFT 608 is connected to an output of the summer 607. An output of the FFT 608 forms an output of the autocorrelation-processing block 603. An optimal value of N for hardware using Bluetooth low energy signals is 2048.

Further operation of the FIG. 6 apparatus will now be described with reference to FIG. 8.

Operation begins at step 801. At step 802, the samples that form the observation data vector y stored in the memory block 600 are obtained. Step 802 may involve operation of other components of the apparatus shown in FIG. 3.

At step 803, samples of the observation data vector y are organised. This is described above with reference to FIG. 7.

At step 804 convolution is formed for each of the L resulting vectors. Convolution to compute the auto-correlation sequences of each of the vectors R0, . . . , RL is performed by the convolution blocks 606 shown in FIG. 6.

At step 805, the convolved vectors are summed by the summer 607. At step 806, the summed convolved vectors are fast Fourier transformed by the N point FFT 608. The result of step 806 is a series of values, each value relating to a magnitude of a signal at a different frequency.

At step 807, the carrier frequency offset is extracted by the carrier frequency offset extraction block 604. This step involves searching the output of the FFT block 608 for the frequency index where the maximum occurs. This indicates the frequency at which the greatest magnitude signal is found, and identifies the carrier frequency offset.

The carrier frequency offset thus extracted is provided to the signal processing block 605. Here the carrier frequency offset is compensated for, which relates to step 808 in FIG. 8. Also, optionally, the signal processing block 605 may provide a measure of receiver signal-to-noise ratio at step 809. This is achieved by an SNR estimator block 609 that forms part of the signal processing block 605. Outputs of the signal processing block 605 include an SNR value at a first output 610 and an antenna array output signal at a second output 611.

At step 810, the signal that has been carrier frequency offset compensated is used to compute the antenna array output signal x, which is then provided at the second output 611. From this, a bearing to the mobile device may be calculated by the base station 30.

The operation ends at step 811.

Between steps 804 and 805 is an optional weighting step 812. At this step, any differences in the numbers of samples of the observation data vectors y that make up the vectors R0 to RL-1 are compensated for. Weighting also allows any faulty antenna elements 32 to be excluded from contributing to carrier frequency offset calculation. Weighting involves multiplying each of the convolved vectors by a factor that is inversely proportional to the number of samples that contribute to the corresponding convolved vector.

Figure 9:
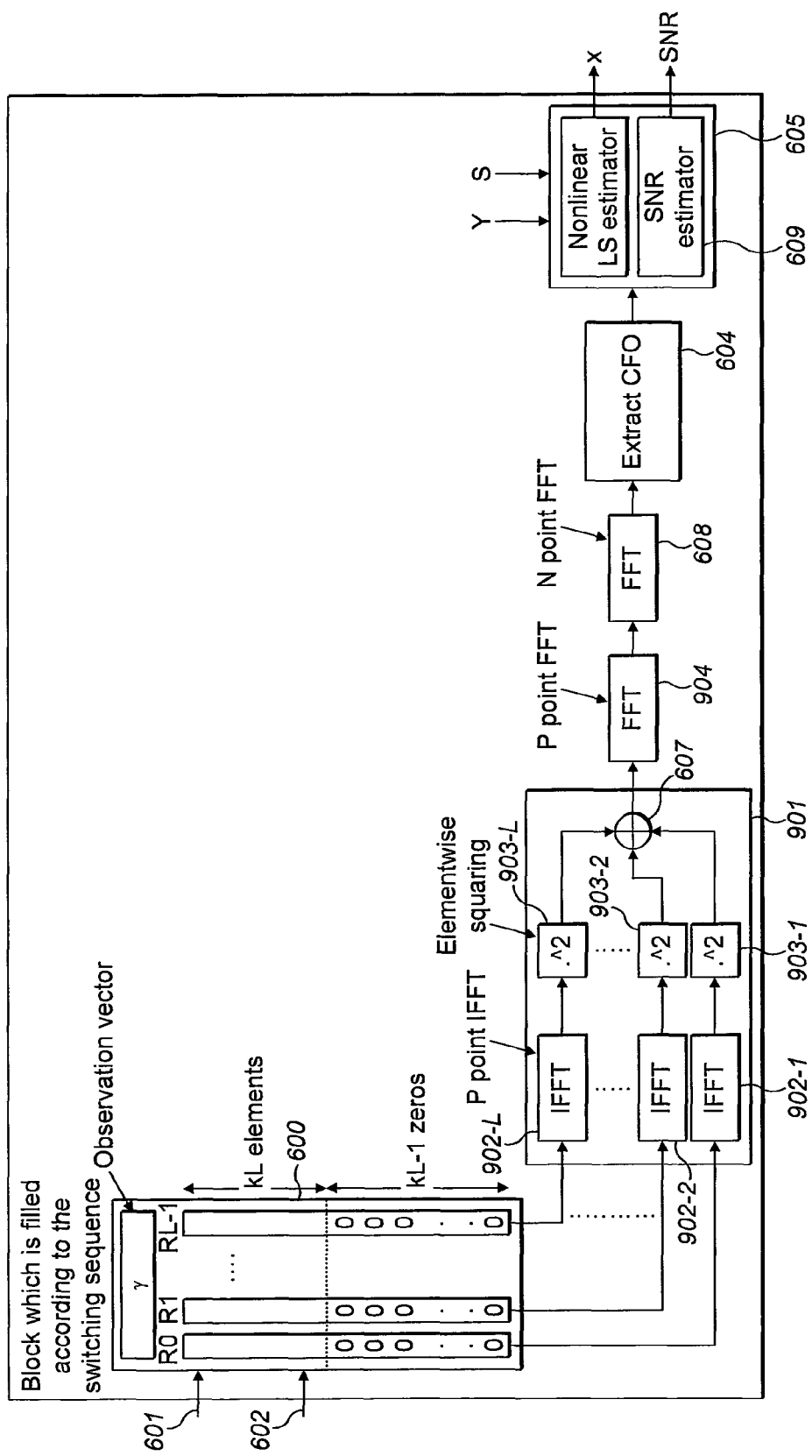
FIG. 9 is a block diagram illustrating apparatus according to a second embodiment for calculating and offsetting carrier frequency.
Figure 10:
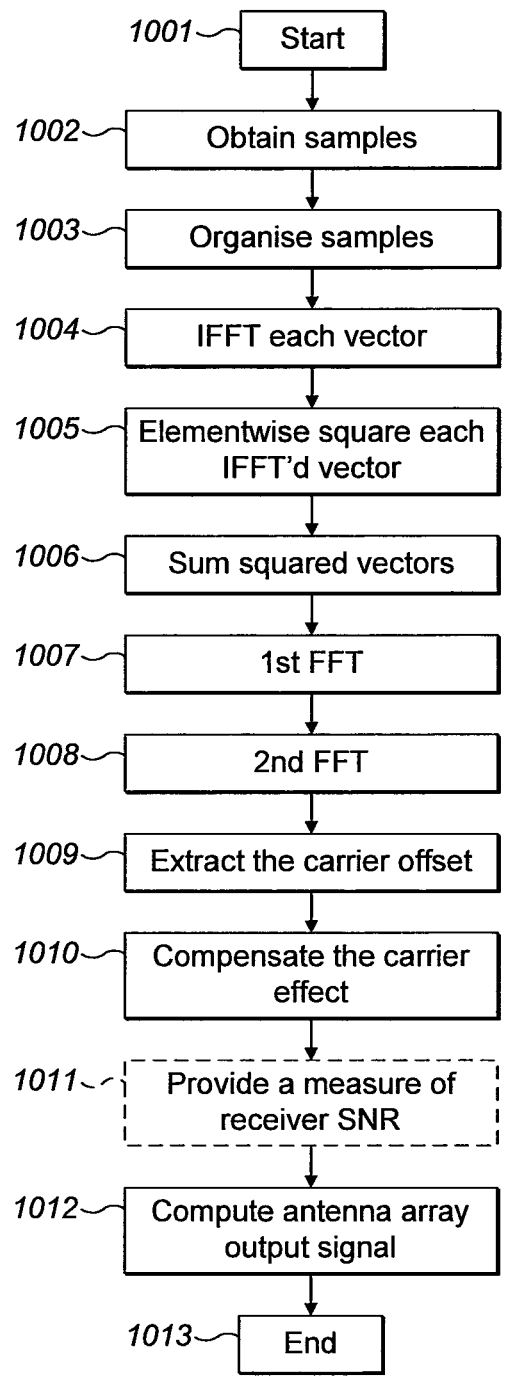
FIG. 10 is a flow chart illustrating operation of the FIG. 9 apparatus.

A second embodiment will now be described with reference to the block diagram of FIG. 9 and the flow chart of FIG. 10. In FIG. 9, reference numerals are retained from FIG. 6 for like elements.

The second embodiment can be summarised as follows. In the second embodiment, the computation of L autocorrelation functions is implemented by L fast convolution circuits. The fast convolution block computes the IFFT of each antenna array port, computes the magnitude squared values of the IFFT output and sums the L outputs. The convolution result is then computed by an FFT. A further FFT then processes the convolution result. The location of the maximum in the output vector of the FFT processor indicates the carrier frequency offset. The carrier frequency offset is then compensated for and the antenna array output signal can then be computed.

In detail, the second embodiment is as follows.

The memory block 600 of FIG. 9 is different from that of FIG. 6 in that it includes 2kL−1 rows and L columns. This is achieved by changing step 702 of FIG. 7 to provide the memory block with 2kL−1 rows. The memory block 600 of FIG. 9 is filled in the same way as that described with reference to steps 703 to 709. However, since there are fewer samples in the observation data vector y than there are rows in the memory blocks 600 of FIG. 9, the last kL−1 rows of the memory block 600 remain as zeros even after all of the observation data vector y samples have been filled into the memory block 600. If the number of samples constituting the observation data vector is less than kL, the number of rows in the memory block may instead be equal to one less than twice the number of samples.

In FIG. 9, the signal processing block 901 is arranged to receive the L vectors output by the memory block 600. The signal processing block 901 includes L inverse fast Fourier transform (IFFT) blocks 902-1 to 902-L. Each of these is connected to a respective one of the columns L of the memory blocks 600. Connected to an output of each of the IFFT blocks 902 is a respective elementwise squaring block 903-1 to 903-L. Outputs of each of the elementwise squaring blocks 903-1 to 903-L are connected to respective inputs of a summing element 607. An output of the summing element 607 constitutes an output of the signal processing block 901.

Connected to the output of the signal processing block 901 is an input of a P point FFT 904. An N point FFT block 608 is connected to an output of the P point FFT block 904. As with the system of FIG. 6, a carrier frequency extraction block 604 is connected to an output of the N point FFT block 608. A signal processing block 605 is the same as that described above with reference 6.

Operation of the apparatus of FIG. 9 will now be described with reference to FIG. 10.

Operation starts at step 1001. At step 1002, samples of the observation data vector y are obtained using the sampler 25 shown in FIG. 3. At step 1003, the samples of the observation data vector y are organised into the memory blocks 600 in the manner described above.

At step 1004, each of the L vectors provided by the memory block 600 is inverse fast Fourier transformed by a respective P point IFFT block 902. Each IFFT processed vector then is magnitude squared by its elementwise squaring block 903 at step 1005. The squared vectors provided by the elementwise squaring blocks 903 are then summed at step 1006 by the summer 607.

The summed squared vectors that result are firstly processed by a first fast Fourier transform block 904, having P points, at step 1007. The length of the transform provided by the P point FFT block 904 is the same as the length of the inverse transform provided by the IFFT blocks 902. As such, the IFFT blocks 902, the elementwise squaring blocks 903, the summer 607 and the first FFT block 904 together convolve the L vectors provided by the memory block 600.

In the arrangement of FIG. 9, it is advantageous that N is equal to or greater than P. An optimal value of N for hardware using Bluetooth low energy signals is 2048. An appropriate value of P depends on kL. The value of P is equal to or greater than 2*kL−1 but advantageously is the next higher power of two, which allows the use of radix-2 FFT processors.

At step 1008, the correlated and combined vectors provided by the P point FFT block 904 are processed by the N point FFT block 608, which operates as described above with reference to FIG. 6. The result is a series of values each of which indicates a magnitude at a different frequency.

At step 1009, the carrier offset is extracted. The carrier offset is compensated at step 1010. Optionally, a combination of a measure of receiver signal to noise ratio is provided at step 1011. The antenna array output signal is then computed at step 1012. Steps 1009 to 1012 are substantially as described above with reference to FIG. 6.

In the second embodiment, weighting may be performed before or after step 1005. At this step, any differences in the numbers of samples of the observation vectors y that make up the vectors R0 to RL-1 are compensated for. Weighting also allows any faulty antenna elements 32 to be excluded from contributing to carrier frequency offset calculation. Weighting involves multiplying each of the convolved vectors by a factor that is inversely proportional to the number of samples that contribute to the corresponding convolved vector.

The operation ends at step 1013.

A third embodiment will now be described with reference to the block diagram of FIG. 11 and the flow chart of FIG. 12. The third embodiment is a computationally efficient realisation to the second embodiment described above with reference to FIGS. 9 and 10. The third embodiment is computationally efficient if only the value of N is relatively low, for instance equal to or less than 1024, which condition will typically be met in implementations in which a highly accurate estimate of the carrier frequency offset is not required. Briefly, instead of using two relatively small FFT blocks and one FFT block as in FIG. 9, the third embodiment uses L long FFT blocks.

Briefly, in the third embodiment, the fast convolution circuits and the FFT of the second embodiment are combined. Here, an FFT processor transforms each of the signals from the L antenna array ports. The values of the L output vectors are then magnitude squared before being summed. The location of the maximum in the output vector of the FFT processor indicates the carrier frequency offset. The carrier frequency offset is then compensated for and the antenna array output signal can be computed.

The third embodiment will now be described in detail. In FIG. 11, a signal processing block 1101 has L inputs, each of which is connected to receive a different one of the L vectors provided by the memory block 600. Within the signal processing block 1101 are L N point FFT blocks 1102-1 to 1102-L. An optimal value of N for hardware using Bluetooth low energy signals is 2048. An elementwise squaring block 1103-1 to 1103-L is provided for each of the FFT blocks 1102. A summing block 1104 is connected to receive the outputs of each of the elementwise squaring blocks 110-3. An output of the summing block 1104 constitutes an output of a signal processing block 1101 and is connected directly to an input of the carrier frequency extraction block 604. A signal processing block 605 is as described above with reference to FIG. 6.

Figure 12:
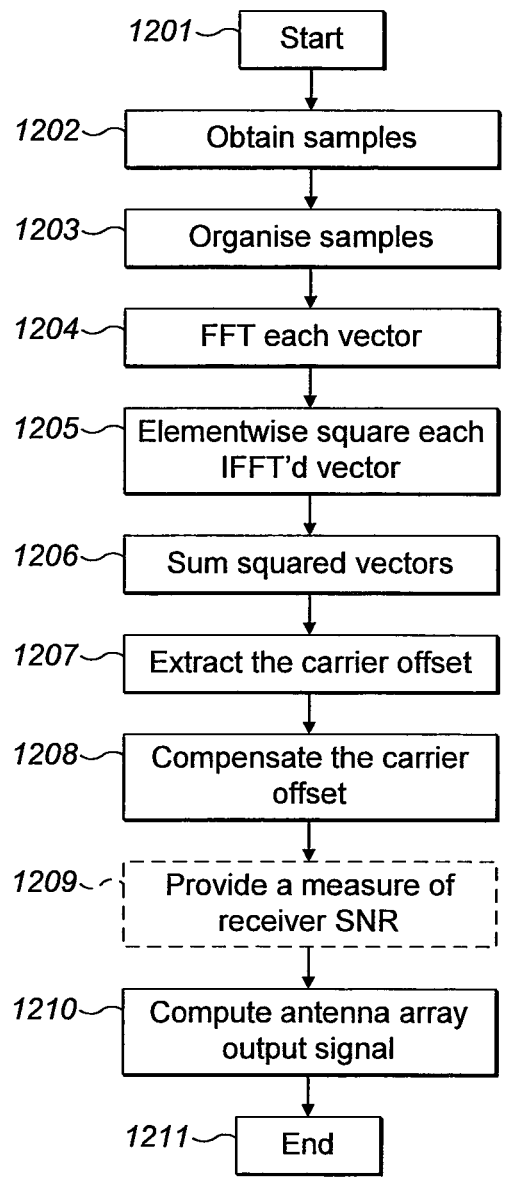
FIG. 12 is a flow chart illustrating operation of the FIG. 11 apparatus.

Referring now to FIG. 12, operation starts at step 1201. At step 1202, the samples that constitute the observation data vector y are obtained. The samples are then organised at step 1203. This is performed in the same way as described above with reference to FIG. 10. The result is kL rows populated with data and kL−1 rows that contain zeros.

Each of the vectors R0 to RL-1 is processed by its respective N point FFT block 1102 at step 1204. The result is, for each of the L vectors, N values each relating to a magnitude at a different frequency. At step 1205, each of the results is magnitude squared by a respective elementwise squaring element 1103. The results are then summed together at step 1206 by the summing element 1104.

The carrier offset is then extracted at step 1207 and compensated at step 1208. Optionally, a measure of receiver SNR is provided at step 1209. The antenna array output signal is then calculated at step 1210. Steps 1207 to step 1210 are the same as described above with reference to FIG. 6.

The operation ends at step 1211.

In the third embodiment, weighting may be performed before or after step 1205. At this step, any differences in the numbers of samples of the observation vectors y that make up the vectors R0 to RL-1 are compensated for. Weighting also allows any faulty antenna elements 32 to be excluded from contributing to carrier frequency offset calculation. Weighting involves multiplying each of the convolved vectors by a factor that is proportional to the number of samples that contribute to the corresponding convolved vector.

Figure 11:
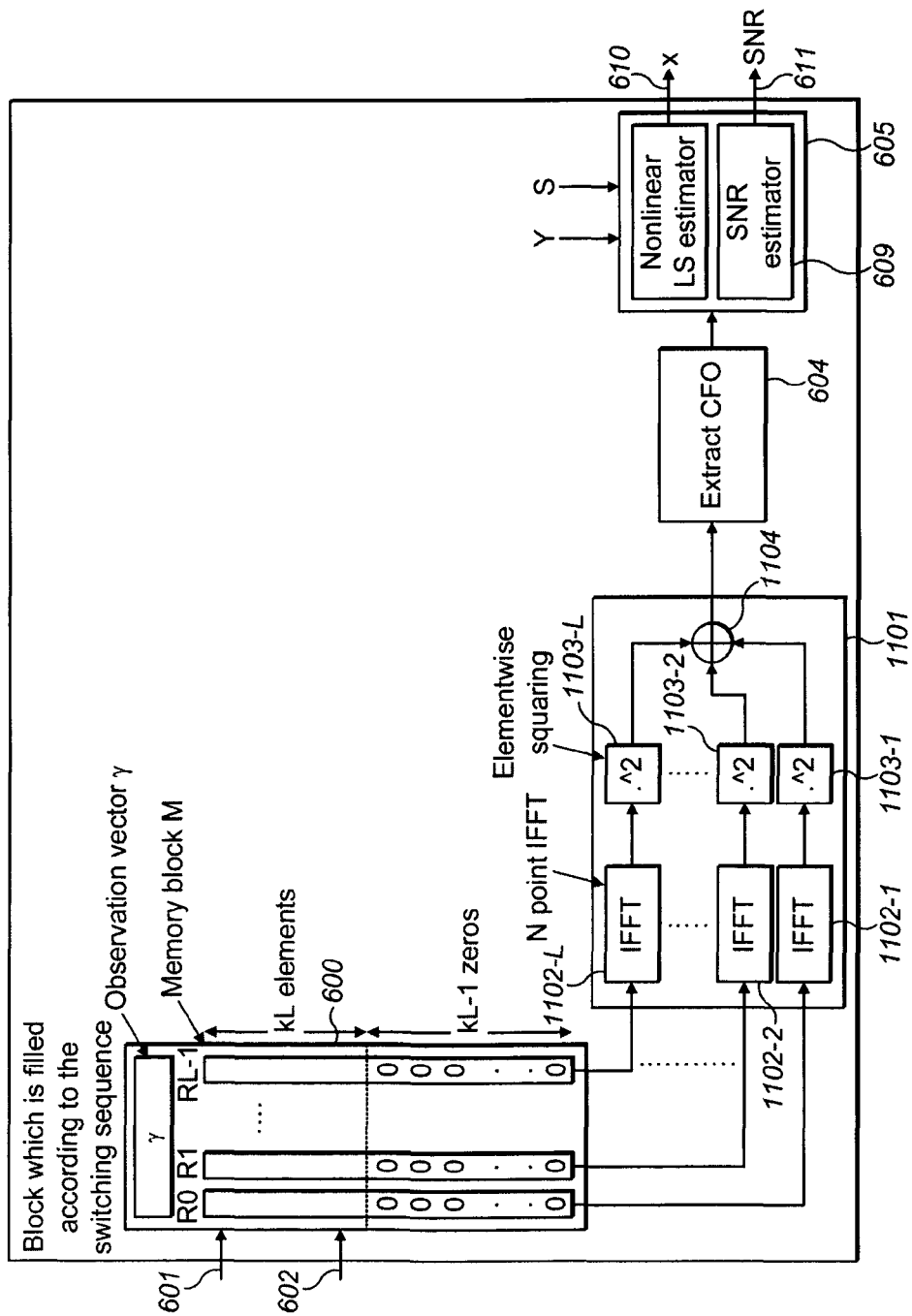
FIG. 11 is a block diagram illustrating apparatus according to a third embodiment for calculating and offsetting carrier frequency.

The apparatus shown in FIGS. 6, 9 and 11 can be implemented in any suitable way. For instance, the apparatus may be implemented as one or more application specific integrated circuits. Alternatively, the apparatus may be implemented as one or more field programmable gate arrays (FPGAs). Further alternatively, the apparatus may be implemented as a combination of application specific integrated circuits and FPGAs. The apparatus may be implemented wholly or in part using a suitably programmed general purpose processor or a signal processor.

In some hardware implementations, the apparatus of FIG. 6, 9 or 11 may be provided as shown at 501 between the sampler 51 and the BMC/MAC 40. In other hardware implementations, the apparatus of FIG. 6, 9 or 11 may be provided as shown at 502 after the BMC/MAC 40.

In other implementations, the apparatus of FIG. 6, 9 or 11 may be provided as shown at 502 after the BMC/MAC 40 and implemented in software. In this case, the apparatus may comprise processing circuitry 503, including one or more processors, and a non-volatile storage device 505, comprising a single memory unit or a plurality of memory units. The processing circuitry 503 may be any type of processing circuitry. For example, the processing circuitry 503 may be a programmable processor that interprets computer program instructions 507 and processes data. The processing circuitry 503 may include plural programmable processors. Alternatively, the processing circuitry 503 may be, for example, programmable hardware with embedded firmware. The processing circuitry 503 may be a single integrated circuit or a set of integrated circuits (i.e. a chipset). The processing circuitry 503 may also be a hardwired, application-specific integrated circuit (ASIC). The processing circuitry may be termed processing means.

The storage device 505 may store computer program instructions 507 that, when loaded into processing circuitry 503, control the operation of the base station 30. The processing circuitry uses volatile memory 504, such as RAM, as working memory. The processing circuitry may operate under control of an operating system 506 that is stored in the memory 505. The computer program instructions 507 provide the logic and routines that enables the apparatus to operate as described with reference to any of FIGS. 8, 10 and 12. The computer program instructions 506 may arrive at the base station apparatus 30 via an electromagnetic carrier signal or be copied from a physical entity 508 such as a computer program product, a memory device or a record medium such as a CD-ROM or DVD.

Compared to alternatives, the carrier frequency offset calculation schemes described above offer a number of advantages. Firstly, they are of relatively low complexity, which simplifies the design, manufacture and testing processes. Secondly, they utilise relatively simple hardware implementation technology. This has advantages in terms of manufacture cost, yield and reliability. Furthermore, the schemes do not require any special switching sequence design. This provides flexibility in design and operation, particularly since the schemes will determine carrier frequency offset for any reasonable switching sequence.

Instead of including the receiver functionality in the base station 30, the receiver may instead be a mobile device. Here, the mobile device does not have a fixed location and orientation. However, the location and/or orientation of transmitting devices, for instance mobile tags, relative to the mobile device can be calculated in the mobile device for use thereby, or can be calculated at a remote location for later use or for provision to the mobile device. The mobile device may be incorporated into a device with other functionality, for instance a mobile phone, smartphone, PDA, netbook, tablet computer, laptop computer etc. The receiver functionality may instead be incorporated into any other suitable device or system.

It will be appreciated that the above-described concepts may be applied to other switched antenna receiver systems and that the positioning of these embodiments is not limiting. However, particular advantage is experienced in relation to positioning because uncorrected carrier frequency offset translates directly to erroneous phase estimates and so results in inaccurate bearing calculations.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialised circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed function device, gate array or programmable logic device etc.

The invention claimed is:

1. A method comprising:
obtaining a set of plurality of samples of signals, the set comprising at least one sample for each of L antenna elements of a receiver, wherein L is an integer greater than two and wherein the samples are of an RF signal that has been downconverted by a downconversion frequency;
for each antenna element, performing an autocorrelation on the samples relating to that antenna element;
summing the results of the autocorrelation for all antenna elements;
converting the summed results into the frequency domain;
determining a maximum value of the summed results in the frequency domain; and
using the determined maximum value to provide an output indicative of an offset between a carrier of the RF signal and the downconversion frequency.

2. A method as claimed in claim 1, wherein converting the summed results into the frequency domain comprises performing a fast Fourier transform.

3. A method as claimed in claim 1, further comprising weighting the autocorrelated samples before summing the results of autocorrelation.

4. A method as claimed in claim 1, wherein performing autocorrelation of samples relating to an antenna element comprises converting vectors provided by the samples relating to the antenna element into time domain vectors and squaring the time domain vectors.

5. A method as claimed in claim 4, wherein converting vectors comprises performing an inverse fast Fourier transform with P points and wherein converting the summed results into the frequency domain comprises performing a fast Fourier transform with P points.

6. A method as claimed in claim 1, wherein performing autocorrelation comprises performing convolution on the I and Q samples.

7. A method as claimed in claim 1, further comprising writing the set of plurality of samples into a memory having L columns and kL rows, wherein k is a maximum number of samples relating to any antenna element.

8. A method comprising:
- obtaining a set of plurality of samples of signals, the set comprising at least one sample for each of L antenna elements of a receiver, wherein L is an integer greater than two and wherein the samples are of an RF signal that has been downconverted by a downconversion frequency;
- for each antenna element, converting vectors provided by the samples relating to that antenna element into frequency domain vectors and squaring the frequency domain vectors;
- summing the squared frequency domain vectors for all antenna elements;
- determining a maximum value of the summed results in the frequency domain; and
- using the determined maximum value to provide an output indicative of an offset between a carrier of the RF signal and the downconversion frequency.

9. A method as claimed in claim 8, wherein converting the summed results into the frequency domain comprises performing a fast Fourier transform.

10. A method as claimed in claim 8, further comprising weighting the frequency domain vectors before summing the squared frequency domain vectors.

11. A method as claimed in claim 8, further comprising organising the plurality of samples by:
- providing a block of memory having L columns;
- initialising the block of memory;
- filling the block of memory such that a jth element of the set of samples is entered into a position described by a coordinate <row, column>=<j,I>, where I denotes an antenna element to which the sample relates.

12. A method as claimed in claim 11, further comprising creating a vector for each antenna element from the samples in the row corresponding to the respective antenna element.

13. An apparatus comprising:
- means configured to obtain a set of plural samples of signals, the set comprising at least one sample for each of L antenna elements of a receiver, where L is an integer greater than two and where the samples are of an RF signal that has been downconverted by a downconversion frequency;
- means configured, for each antenna element, to perform an autocorrelation on the samples relating to that antenna element;
- means configured to sum the results of the autocorrelation for all antenna elements;
- means configured to convert the summed results into the frequency domain;
- a determiner configured to determine a maximum value of the summed results in the frequency domain; and
- means configured to use the determined maximum value to provide an output indicative of an offset between a carrier of the RF signal and the downconversion frequency.

14. Apparatus as claimed in claim 13, comprising means configured to weight the autocorrelated samples before summing the results of autocorrelation.

15. Apparatus as claimed in claim 13, wherein the means configured to perform autocorrelation of samples relating to an antenna element comprises means configured to convert vectors provided by the samples relating to the antenna element into time domain vectors and means configured to square the time domain vectors.

16. An apparatus as claimed in claim 15, wherein the means for converting vectors comprises means configured to perform an inverse fast Fourier transform with P points and the means configured to convert the summed results into the frequency domain comprises means configured to perform a fast Fourier transform with P points; and the means configured to perform autocorrelation is further configured to perform convolution on the samples.

17. Apparatus comprising:
- a receiver configured to receive a set of plural samples of signals, the set comprising at least one sample for each of L antenna elements of a receiver, wherein L is an integer greater than two and wherein the samples are of an RF signal that has been downconverted by a downconversion frequency;
- an autocorrelator configured, for each antenna element, to perform autocorrelation on the samples relating to that antenna element;
- a summer configured to sum the results of autocorrelation for all antenna elements;
- a domain converter configured to convert the summed results into the frequency domain;
- a processor configured to determine a maximum value of the summed results in the frequency domain; and
- an offset provider configured to use the determined maximum value to provide an output indicative of an offset between a carrier of the RF signal and the downconversion frequency.

18. A non-transitory computer readable medium having stored thereon a computer program comprising machine readable instructions that when executed by a computer apparatus cause the computer apparatus to perform the functions described in claim 17.

19. Apparatus comprising:
- a receiver configured to receive a set of plural samples of signals, the set comprising k samples for each of L antenna elements of a receiver, where L is an integer greater than two and where the samples are of an RF signal that has been downconverted by a downconversion frequency;
- a converter configured, for each antenna element, to convert vectors provided by the samples relating to that antenna element into frequency domain vectors and to square the frequency domain vectors;
- a summer configured to sum the squared frequency domain vectors for all antenna elements;
- a determiner configured to determine a maximum value of the summed results in the frequency domain; and
- an offset provider configured to use the determined maximum value to provide an output indicative of an offset between a carrier of the RF signal and the downconversion frequency.

20. A non-transitory computer readable medium having stored thereon machine readable instructions that when executed cause an apparatus to perform:
- obtaining a set of plural samples of signals, the set comprising at least one sample for each of L antenna elements of a receiver, where L is an integer greater than two and where the samples are of an RF signal that has been downconverted by a downconversion frequency;
- for each antenna element, performing autocorrelation on the samples relating to that antenna element;
- summing the results of autocorrelation for all antenna elements;

converting the summed results into the frequency domain;
determining a maximum value of the summed results in the frequency domain; and
using the determined maximum value to provide an output indicative of an offset between a carrier of the RF signal and the downconversion frequency.

21. Apparatus comprising:
one or more processors in communication with one or more memories, the one or memories having stored therein one or more computer programs that include computer code configured such as when executed to cause the processor to:
obtain a set of plural samples of signals, the set comprising at least one sample for each of L antenna elements of a receiver, where L is an integer greater than two and where the samples are of an RF signal that has been downconverted by a downconversion frequency;
for each antenna element, perform autocorrelation on the samples relating to that antenna element;
sum the results of autocorrelation for all antenna elements;
convert the summed results into the frequency domain;
determine a maximum value of the summed results in the frequency domain; and
use the determined maximum value to provide an output indicative of an offset between a carrier of the RF signal and the downconversion frequency.

22. A non-transitory computer readable medium having stored thereon machine readable instructions that when executed cause an apparatus to perform:
obtaining a set of plural samples of signals, the set comprising at least one sample for each of L antenna elements of a receiver, where L is an integer greater than two and where the samples are of an RF signal that has been downconverted by a downconversion frequency;
for each antenna element, converting vectors provided by the samples relating to that antenna element into frequency domain vectors and squaring the frequency domain vectors;
summing the squared frequency domain vectors for all antenna elements;
determining a maximum value of the summed results in the frequency domain; and
using the determined maximum value to provide an output indicative of an offset between a carrier of the RF signal and the downconversion frequency.

23. Apparatus comprising:
one or more processors in communication with one or more memories, the one or memories having stored therein one or more computer programs that include computer code configured such as when executed to cause the processor to:
obtain a set of plural samples of signals, the set comprising at least one sample for each of L antenna elements of a receiver, where L is an integer greater than two and where the samples are of an RF signal that has been downconverted by a downconversion frequency;
for each antenna element, convert vectors provided by the samples relating to that antenna element into frequency domain vectors and squaring the frequency domain vectors;
sum the squared frequency domain vectors for all antenna elements;
determine a maximum value of the summed results in the frequency domain; and
use the determined maximum value to provide an output indicative of an offset between a carrier of the RF signal and the downconversion frequency.

* * * * *